United States Patent [19]

Araquistain et al.

[11] Patent Number: 4,951,479
[45] Date of Patent: Aug. 28, 1990

[54] REFRIGERATION SYSTEM

[75] Inventors: Mark E. Araquistain, Caldwell; Edwin R. Brandt, Boise, both of Id.

[73] Assignee: J.R. Simplot Company, Boise, Id.

[21] Appl. No.: 440,719

[22] Filed: Nov. 24, 1989

[51] Int. Cl.⁵ .............................................. B06H 1/32
[52] U.S. Cl. ....................................... 62/239; 52/302; 62/384; 62/407; 105/355; 105/463.1
[58] Field of Search ................ 62/384, 239, 388, 407; 52/302; 105/355, 463.1

[56] References Cited

U.S. PATENT DOCUMENTS

| | | | |
|---|---|---|---|
| 2,055,537 | 9/1936 | Hulse et al. | 105/355 |
| 2,376,653 | 5/1945 | Boyer | 105/355 |
| 3,561,226 | 2/1971 | Rubin | 62/51.1 |
| 3,864,936 | 2/1975 | Frank et al. | 62/384 |
| 3,899,981 | 8/1975 | Josephson | 105/355 |
| 4,498,306 | 2/1985 | Tyree, Jr. | 62/239 |
| 4,593,536 | 6/1986 | Fink et al. | 62/384 |
| 4,704,876 | 11/1987 | Hill | 62/388 |
| 4,761,969 | 8/1988 | Moe | 62/388 |
| 4,800,733 | 1/1989 | Strobel et al. | 62/239 |
| 4,825,666 | 5/1989 | Saia, III | 62/384 |

Primary Examiner—Ronald C. Capossela
Attorney, Agent, or Firm—Kelly Bauersfeld & Lowry

[57] ABSTRACT

An improved refrigeration system is provided for use in a rail car or the like to refrigerate perishable items such as produce. The refrigeration system includes a plurality of modular ceiling panels mounted near the roof of a rail car or the like to define an upper ceiling compartment disposed over a main storage compartment. The ceiling compartment includes a central bunker for receiving a cryogenic material, such as carbon dioxide snow, wherein the bunker is separated by short partition walls from a pair of elongated plenum chambers extending along both sides of the bunker. Cryogenic gas formed by sublimation spills over the partition walls for passage from the bunker into the plenum chambers, and for further passage from the plenum chambers through downflow ports in the panels into the underlying main storage compartment to refrigerate perishable items therein.

10 Claims, 3 Drawing Sheets

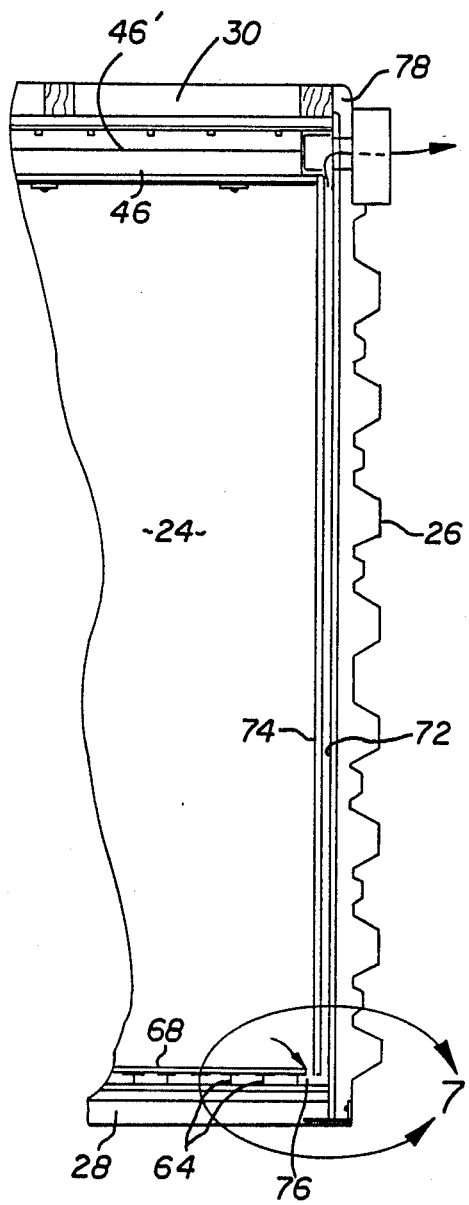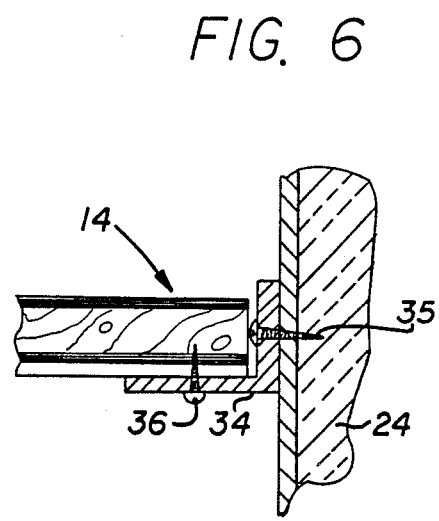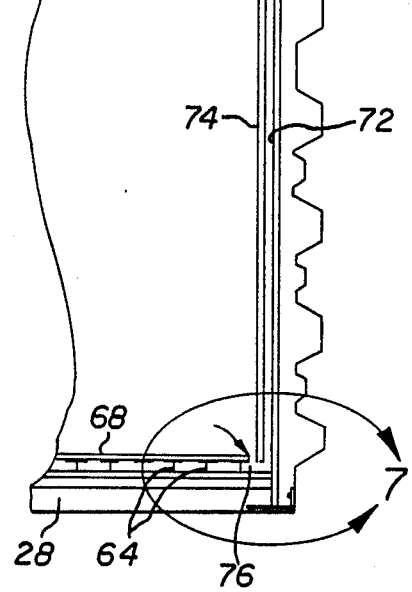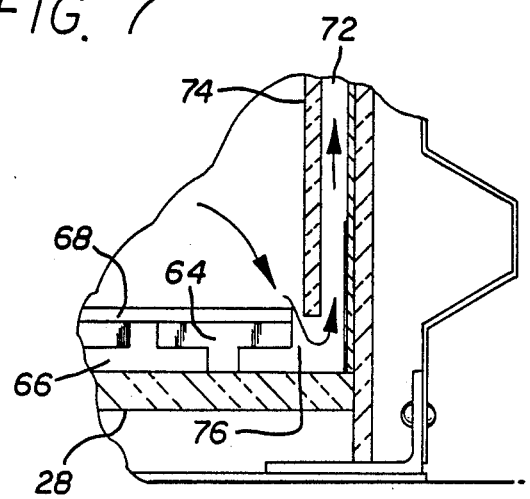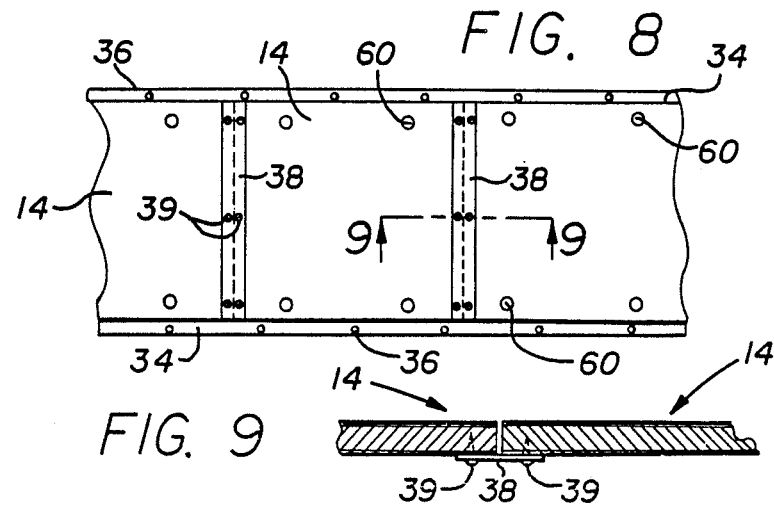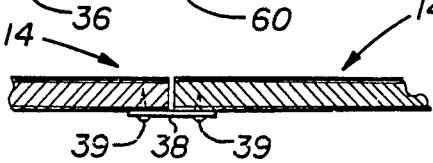

REFRIGERATION SYSTEM

BACKGROUND OF THE INVENTION

This invention relates generally to refrigeration systems and equipment for use in rail cars, trucks and other transport vehicles to maintain perishable items such as food products at a selected refrigerated temperature. More particularly, this invention relates to an improved refrigeration system having modular components which can be installed quickly and easily into a rail car or the like to support cryogenic refrigerant and to control flow of sublimated cryogenic gas.

A wide variety of perishable items particularly such as food products are routinely shipped in a chilled or frozen state to avoid product spoilage and/or contamination. In this regard, refrigeration systems for use in transport or shipping vehicles such as rail cars, trucks, and the like are well known and have been widely used for many years. In one common form, such refrigeration systems have utilized conventional mechanical refrigeration units for maintaining a controlled temperature within an insulated storage container or compartment. However, mechanical refrigeration units are relatively costly and require significant maintenance over a typical service life. Moreover, mechanical refrigeration equipment normally exhibits relatively high power or energy consumption, wherein an appropriate fuel or electrical power source for the refrigeration unit must be carried with the shipping vehicle.

In recent years, non-mechanical refrigeration systems have acquired significant commercial interest in efforts to avoid the cost and related complexities associated with standard mechanical refrigeration equipment. In a non-mechanical system, the rail car or the like is modified to carry an expendable supply of a cryogenic material, particularly such as carbon dioxide in solid form, commonly known as dry ice. The cryogenic material is supported in close association with the items being shipped to maintain a sufficiently low temperature to prevent spoilage. Over a period of time which may include several days, the solid carbon dioxide sublimates into the form of cryogenic gas which is normally circulated over or about the perishable items prior to exhausting to the atmosphere through suitable vents. Such non-mechanical refrigeration systems as typified by the prior art are described, by way of example, in U.S. Pat. Nos. 3,561,226; 4,761,969; and 4,704,876.

While non-mechanical refrigeration systems using cryogenic materials offer significant advantages in use, as described above, the structural components used to support the cryogenic material and/or to control the flow of sublimated cryogenic gas have been relatively complex and costly to install within a rail car or other shipping vehicle. Moreover, some prior system arrangements have envisioned multidirectional gas flow paths which are difficult to implement in a manner assuring substantially uniform low temperature throughout the storage space, especially when the storage space is fully loaded with the perishable products.

There exists, therefore, a significant need for further improvements in non-mechanical refrigeration systems of the type used to refrigerate perishable products in a shipping container such as a rail car or the like, particularly with respect to relatively simple and easily installed structures for supporting cryogenic material and for distributing resultant cryogenic gases relatively uniformly throughout a storage compartment. The present invention fulfills these needs and provides further related advantages.

SUMMARY OF THE INVENTION

In accordance with the invention, an improved refrigeration system of the non-mechanical type is provided for refrigerating perishable items such as food products within a shipping vehicle or container, such as a rail car or the like. The improved refrigeration system includes modular components adapted for rapid installation into a rail car or the like, either in the form of an original equipment installation or as a retrofit system within an existing rail car. The modular components provide structural support for cryogenic material in solid form and function further to guide flow of sublimated cryogenic gases for substantially uniform distribution throughout a storage compartment.

In the preferred form of the invention, a plurality of modular ceiling panels are installed within the storage compartment of a rail car or the like to form a false ceiling disposed in relatively close proximity with a compartment roof. The modular panels each have a generally rectangular shape adapted to extend across the storage compartment in side-by-side relation. Each modular panel further includes a pair of relatively short wall members upstanding therefrom at positions spaced inwardly from the opposite ends of the panel, together with at least one and preferably two open downflow ports formed between each wall member and the adjacent outboard end of the panel.

When the modular panels are installed in side-by-side relation within the storage compartment, the panels cooperate with the roof and adjacent compartment wall structures to define an upper ceiling compartment disposed overhead relative to a lower main storage compartment for receiving perishable products. The wall members of the individuals panels align with each other and cooperate to form a pair of elongated short partitions which define a pair of longitudinally extending plenum chambers running along opposite sides of a central bunker. Solid cryogenic material such as carbon dioxide snow is supplied into the bunker by means of a suitable spray manifold or the like. In operation, the cryogenic material sublimates to form cryogenic gases which build up sufficiently within the bunker to spill over the partitions for flow into and collection within the plenum chambers. From the plenum chamber, the cryogenic gases flow downwardly through the downflow ports into the storage compartment with substantially uniform distribution along both sides of the storage compartment.

In accordance with further aspects of the improved refrigeration system, the downflow of cryogenic gas passes over and about products within the main storage compartment prior to venting to atmosphere at opposite ends of the storage compartment. An improved compartment floor includes transverse subfloor flow channels to permit gas flow beneath at least a substantial portion of the storage compartment. Such floor channels are substantially covered by floor panels to facilitate product loading and unloading, and further to prevent accumulation of debris within the channels. Gas flow into and from the floor channels is permitted via elongated gutters disposed along opposite sides of the compartment. At opposite ends of the storage compartment, the cryogenic gas is exhausted through exhaust flues having lower ends at or near the compartment floor and upper vents near the compartment roof.

Other features and advantages will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings:

FIG. 5 is a fragmented longitudinal vertical sectional view taken generally on the line 5—5 of FIG. 2;

FIG. 6 is an enlarged fragmented vertical sectional view corresponding with the encircled region 6 of FIG. 2;

FIG. 7 is an enlarged fragmented vertical sectional view corresponding with the encircled region 7 of FIG. 5;

FIG. 8 is a somewhat schematic bottom plan view illustrating a plurality of the modular ceiling panels; and FIG. 9 is a fragmented vertical sectional view taken generally on the line 9—9 of FIG. 8.

DETAILED DESCRIPTION OF THE PREFERRED EMBODIMENT

Figure 1:
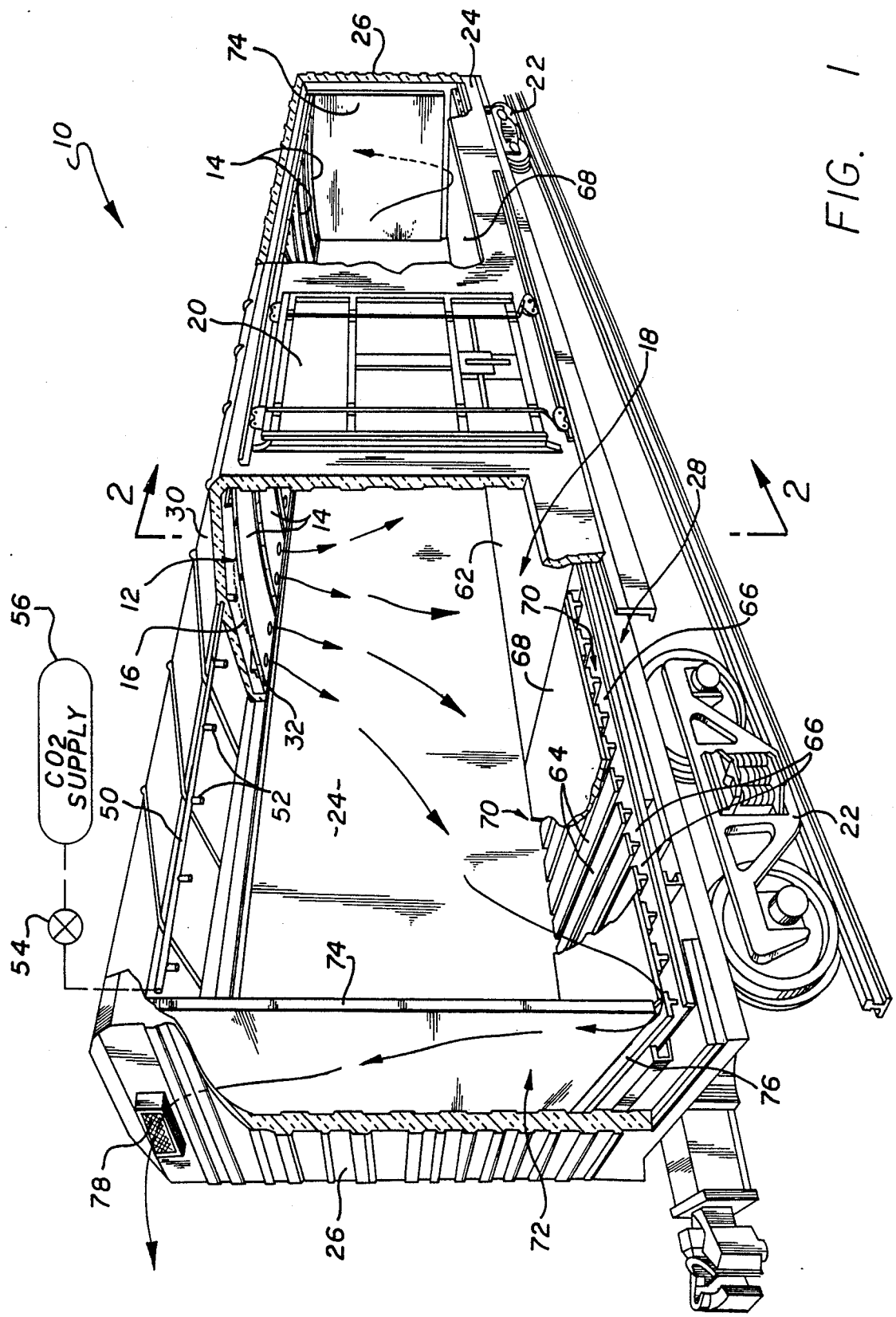
FIG. 1 is a partially fragmented perspective view of a rail car including the improved refrigeration system embodying the novel features of the invention.

As shown in the exemplary drawings, a rail car referred to generally in FIG. 1 by the reference numeral 10 incorporates an improved refrigeration system 12 for maintaining perishable items such as food products (not shown) within the rail car at a selected low temperature state to avoid spoilage and/or contamination. The improved refrigeration system 12 includes an assembled plurality of modular ceiling panels 14 which are quickly and easily installed within the rail car, and which provide a support structure for supporting a cryogenic material 16 for sublimation and distribution of cryogenic gas with substantial uniformity throughout a main storage compartment 18.

The illustrative rail car 10 is representative of a typical shipping container within which perishable items such as food products are commonly placed for shipment to a selected destination. In this regard, it will be understood that the present invention is applicable to shipping and/or storage containers in general, including but not limited to rail cars, trucks, and containerized packages for air or water transport. The perishable products are loaded into the main storage compartment 18, typically by access through a normally closed door 20, and are confined within the storage compartment at the desired low temperature state for the duration of shipment from one place to another, often for several days. The improved refrigeration system 12 of the present invention provides a non-mechanical arrangement utilizing cryogenic material particularly such as carbon dioxide (dry ice) in solid form to control the temperature within the main compartment 18. Means are provided for circulating sublimated cryogenic gases around and beneath a substantial portion of the compartment 18, and for exhausting the gases from the compartment 18 in a safe manner.

Figure 2:
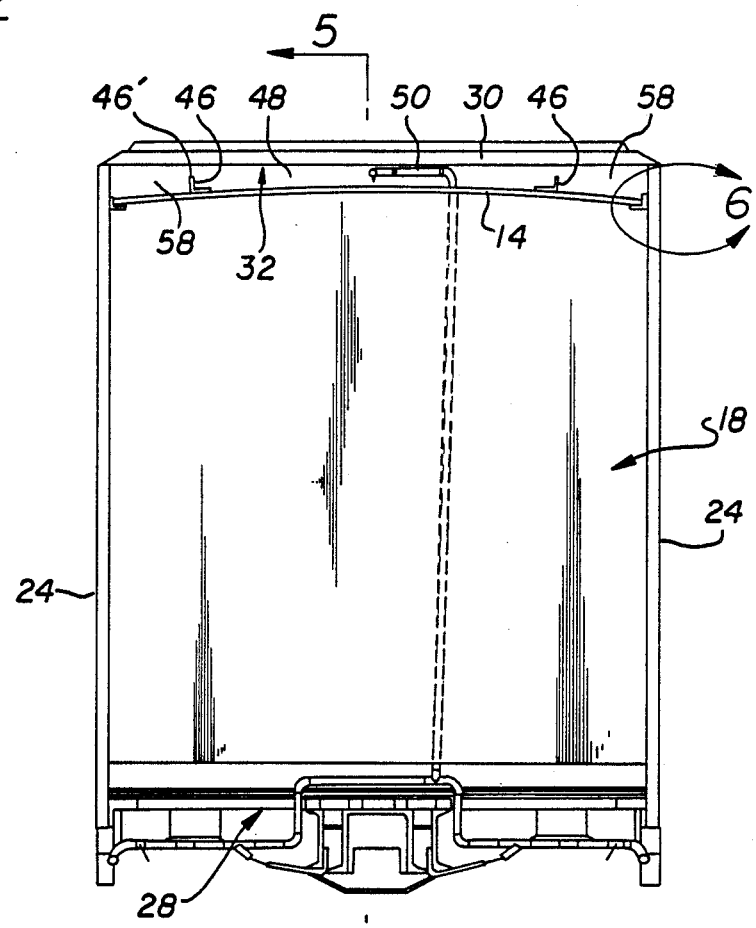
FIG. 2 is a transverse vertical sectional view taken generally on the line 2—2 of FIG. 1.

As shown generally in FIGS. 1 and 2, the rail car 10 has a generally conventional overall construction to include an elongated rectangular housing supported on railroad wheel assemblies 22. The rail car housing includes a pair of side walls 24 and a pair of end walls 26 upstanding from a main floor 28, and cooperating with a roof 30 to define the enclosed main storage compartment 18. In accordance with the invention, the modular ceiling panels 14 are installed near the top of the compartment 18 in closely spaced relation with the roof 30 to define a shallow upper ceiling compartment 32 extending substantially the entire length of the car without significantly reducing available volume for receiving perishable products.

More specifically, each modular panel 14 has a generally rectangular shape with an appropriate length sufficient to span the width of the main compartment 18. The width of each modular panel is also chosen to have a standardized dimension such that the panels 14 can be installed in side-by-side relation (FIG. 1) to define a false ceiling spaced a few inches below the roof 30 of the rail car, wherein this false ceiling extends completely from one end of the car to the other. Such installation of the panels 14 can be performed quickly and easily on virtually any rail car, with angle brackets 34 having vertical legs fastened by screws 35 or the like into the adjacent end or side wall (FIG. 6) and horizontal legs fastened by screws 36 or the like to support the edges of the panels. Intermediate support plates 38 (FIGS. 8 and 9) may also be provided to bridge the side margins of adjacent panels 14 spanning the rail car, with screws 39 fastening the panels to these support plates.

Figure 3:
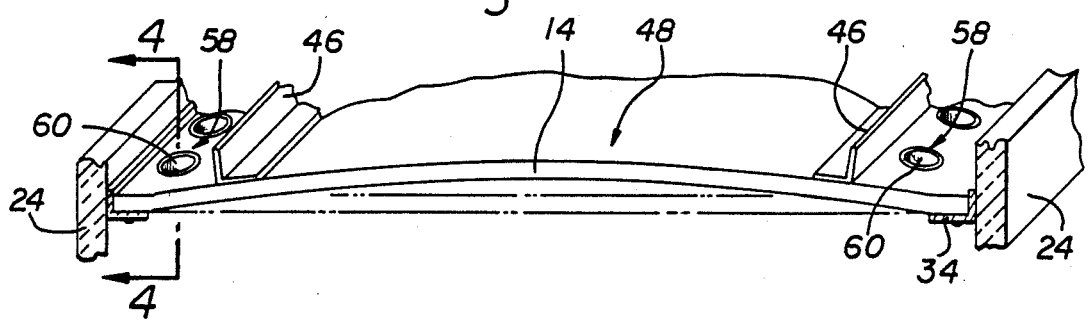
FIG. 3 is an enlarged fragmented perspective view corresponding with an upper portion of FIG. 2 and illustrating installation of a modular ceiling panel used in the refrigeration system.
Figure 4:
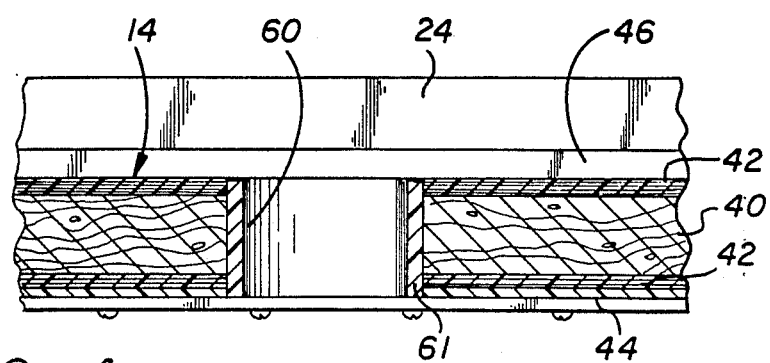
FIG. 4 is an enlarged fragmented vertical sectional view taken generally on the line 4—4 of FIG. 3.

The individual modular ceiling panels 14 desirably have a generally rectangular and lightweight construction adapted to support the cryogenic material, as will be described, yet resist damage attributable to moisture and/or condensation which can occur as a result of the low temperature operating environment. FIGS. 3, 4 and 6 illustrate the panels 14 to have a lightweight core 40 of balsa wood or the like sandwiched between laminations 42 of a fiber material having fibers oriented to extend across the rail car for added panel strength. The underside of the panel is in turn covered with a moisture barrier 44 such as a suitable plastic lamination to prevent moisture migration from the underlying main storage compartment 18 into the panel.

As shown in FIGS. 1–3, each of the modular panels 14 includes a pair of short upstanding wall members 46 near the opposite ends thereof. These wall members may be conveniently formed by additional angle brackets and are oriented generally in parallel to extend across the width of each panel at locations spaced inboard from the respective ends of the panel. With this construction, the wall members 46 of the multiple panels 14 align end-to-end when the panels are installed to cooperatively define a pair of short partitions running longitudinally from one end of the rail car to the other. Importantly, as viewed in FIGS. 2 and 5, the uppermost margin 46', of this resultant partition is spaced a short distance below the roof 30.

The space or volume between the two partitions comprises an elongated bunker 48 for receiving and supporting the cryogenic material 16. In this regard, the rail car 10 is equipped with a manifold pipe 50 extending along the underside of the roof 30 and including a spaced plurality of spray nozzles 52 opening into a central region of the bunker 48. A suitable valve 54 (FIG. 1) is operable to connect a flow of liquid carbon dioxide 56 or the like for spraying through the nozzles 52 into the bunker 48. As is known in the art, this spraying action converts the liquid cryogenic material into snow-like flakes which pack within the bunker 48 generally between the side wall partitions. As viewed in FIG. 3, the modular panels 14 may be prebowed or arched upwardly prior to loading with the cryogenic material to accommodate such loading with a lightweight structure. As the panels 14 are loaded, they will tend to sag toward the dotted line horizontal position shown in FIG. 3.

In use, during shipment of products within the rail car 10, the cryogenic material will sublimate to gaseous form. This cryogenic gas will build up between the sidewall partitions 46 and eventually spill outwardly over the partitions into elongated plenum chambers 58 lining both sides of the bunker 48. The flow and pressure of the sublimated gas generally distributes the gas with substantial uniformity within the plenum chamber 58 before the gases flow downwardly through downflow ports 60 formed in the panels 14 at outboard locations relative to the partitions 46. At least one and preferably two downflow ports 60 are formed at each end of each panel to obtain substantially uniform downflow of cryogenic gas into the underlying main storage compartment 18, wherein this flow occurs along both sides of the compartment for flow about and around perishable cargo. As viewed in FIG. 4 the downflow ports 60 are desirably lined within a moisture barrier such as a plastic sleeve 61 to prevent moisture entry into the panel interior.

Substantially uniform temperature distribution within the main compartment 18 is enhanced by providing at least some flow of cryogenic gas through the compartment flow 28 beneath the cargo. In this regard, a solid central floor segment 62 (FIG. 1) is normally provided in the door area of the main compartment to permit unrestricted maneuvering of a forklift or other equipment used to load or unload the perishable products. However, beyond the door area in both directions, the present system beneficially includes a plurality of transversely extending T-channel members 64 or the like to define transversely open cross channels 66 (FIGS. 1, 5 & 7) for gas flow beneath the cargo. However, the channel members 64 are disposed beneath an overlying floor panel 68 to prevent debris from falling into the channels 66 and further to facilitate movement of personnel and equipment into the rail car. The floor panels 68 and the channel members 64 terminate at positions spaced a few inches inboard from the side walls 24 to define upwardly open gutters 70 which permit gas flow into and exit from the channels 66.

Cryogenic gas within the main storage compartment travels eventually to the opposite ends of the rail car 10 for exhaustion to the outside. In this regard, as viewed in FIGS. 1 and 7, each end of the car includes an exhaust flue 72 defined by the car end wall 26 and a closely inboard spaced flue wall 74. A lower inlet 76 substantially at floor level permits gas entry into the flue 72 for travel further to the outside through a suitable vent 78.

The refrigeration system 12 of the present invention thus provides relatively simple modular components adapted for rapid assembly into a storage container such as a rail car as an original equipment or retrofit installation. The modular panels provide a bunker for cryogenic material, in combination with pressure distribution plenum chambers and downflow ports for supplying cryogenic gas to a storage compartment loaded with perishable items.

A variety of further modifications and improvements to the refrigeration system described and shown herein will be apparent to those skilled in the art. Accordingly, no limitation on the invention is intended by way of the foregoing description and accompanying drawings, except as set forth in the appended claims.

What is claimed is:

1. A refrigeration system for a shipping container such as a rail car or the like having side walls and end walls cooperating with a floor and roof to define a storage compartment, said system comprising:
   a plurality of modular ceiling panels of generally rectangular shape and each having a width sufficient to span between the side walls defining the storage compartment, each of panels further including a pair of upstanding wall members on one side thereof and extending across the width of said panel at positions spaced short distances from the opposite ends of said panel; and
   means for mounting said panels in generally side-by-side relation within the shipping container at a position spaced relatively close to the roof to define a false ceiling dividing said storage compartment into an upper ceiling compartment and a lower main storage compartment, said wall members of said panels being generally aligned to define a pair of partitions spaced at least a short distance from the roof;
   said partitions dividing said upper ceiling compartment into a central bunker disposed between said partitions and adapted to receive a cryogenic material, and a pair of elongated plenum chambers extending along opposite sides of said bunker;
   a plurality of said panels further defining downflow ports opening from both of said plenum chambers into said main storage compartment, whereby cryogenic gas sublimated from the cryogenic material flows over said partitions and into said plenum chambers, and further though said downflow parts into the main storage compartment.

2. The refrigeration system of claim 1 wherein each of said panels includes at least two of said downflow ports formed therein at respective outboard positions relative to said wall member of said panel.

3. The refrigeration system of claim 2 wherein each of said panels includes a pair of said downflow ports at both ends thereof.

4. The refrigeration system of claim 2 wherein each of said downflow ports is lined with a moisture barrier liner sleeve.

5. The refrigeration system of claim 1 wherein each of said panels is prebowed upwardly.

6. The refrigeration system of claim 1 further includes means for supplying cryogenic material into said bunker.

7. The refrigeration system of claim 1 further includes means defining a plurality of transversely extending subfloor channels distributed through a portion of said floor for transverse circulation of cryogenic gas beneath said main storage compartment.

8. The refrigeration system of claim 1 further including means for venting cryogenic gas from said main storage compartment.

9. The refrigeration system of claim 8 wherein said venting means comprises a pair of flue vents formed generally at opposite ends of said main storage compartment.

10. A refrigeration system for a shipping container such as a rail car or the like having side walls and end walls cooperating with a floor and roof to define a storage compartment, said system comprising:

a plurality of modular ceiling panels of generally rectangular shape and each having a width sufficient to span between the side walls defining the storage compartment, each of said panels further including a pair of upstanding wall members on one side thereof and extending across the width of said panel at positions spaced short distances from the opposite ends of said panel;

a false ceiling mounted within the shipping container at a position spaced relatively close to the roof to divide the storage compartment into an upper ceiling compartment and lower main storage compartment; and a pair of partitions mounted generally in parallel relation on said false ceiling and projecting upwardly therefrom at respective positions inset from the side walls, said partitions defining the opposite sides of a central bunker adapted to receive a cryogenic material, said partitions further defining a pair of plenum chambers running along opposite side of the bunker;

said false ceiling further including a plurality of downflow ports opening from said plenum chambers into the main storage compartment.

* * * * *